May 17, 1960  T. H. BERRY  2,936,564
BLADE UNIT FOR ROTARY BRUSH CUTTERS
Filed Dec. 30, 1957
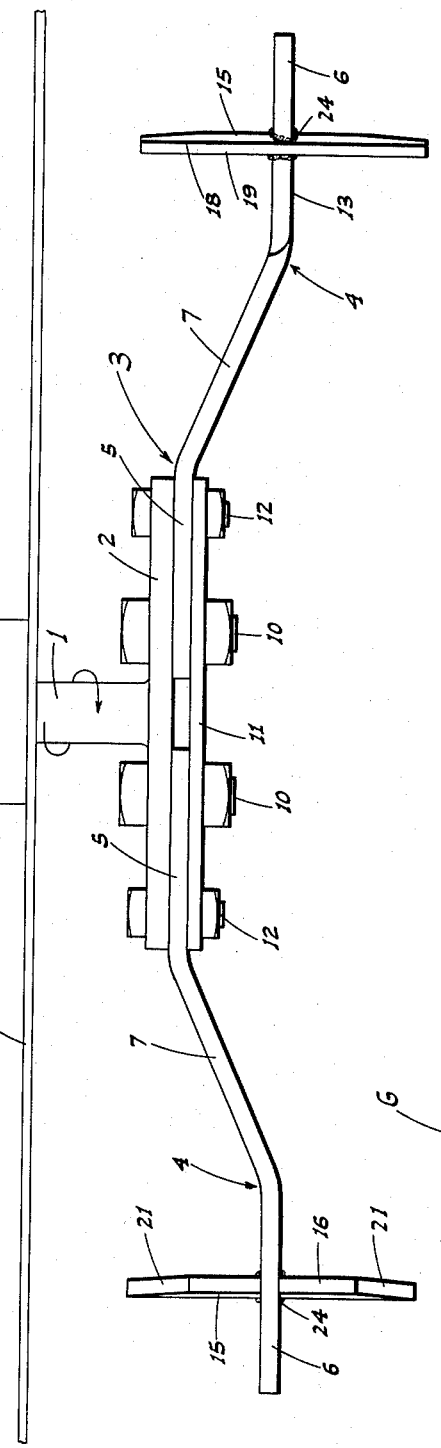
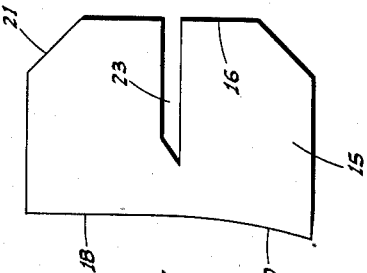
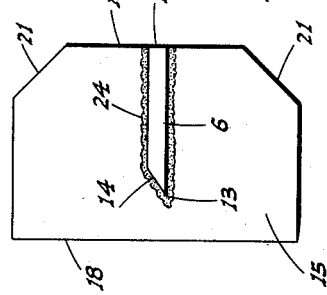
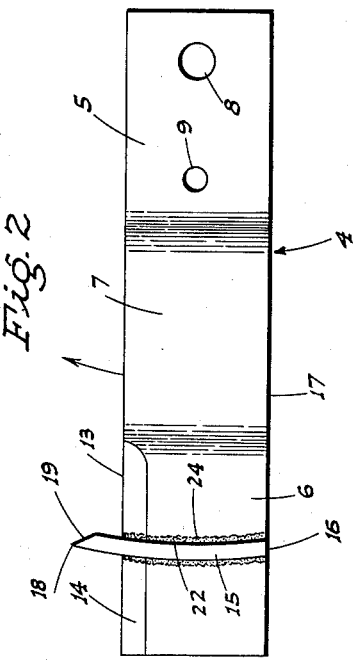
INVENTOR.
Thomas H. Berry
BY
ATTYS

United States Patent Office 2,936,564
Patented May 17, 1960

2,936,564

BLADE UNIT FOR ROTARY BRUSH CUTTERS

Thomas H. Berry, Modesto, Calif.

Application December 30, 1957, Serial No. 706,055

4 Claims. (Cl. 56—295)

This invention relates to agricultural implements known generally as stalk or brush cutters, and which are designed to chop or cut up tree and vine prunings, stalks, brush, and other debris of a similar nature lying on the ground, and which—while having valuable mulch and humus forming properties—must be shredded or chopped into small pieces before such properties can be of avail.

The present invention deals with the rotary-cutter type of implement for the purpose—all of which as previously-constructed, as far as I have been able to ascertain—fail to successfully cope with such prunings or other cuttings which tend to lie horizontally on or adjacent the ground.

The principal object of my invention is to provide a blade unit for a rotary cutter which will effectively chop up all prunings or other cuttings in its path, regardless of the positioning of the cuttings relative to a horizontal plane.

Another object of the invention is to so construct the blade unit that it will clear itself from the cut material as the blade unit rotates and the implement advances, and there is no tendency for any such material to clog or jam the rotary cutter.

It is also an object of the invention to provide a blade unit for rotary brush cutters which is designed for ease and economy of manufacture.

It is also an object of the invention to provide a practical, reliable, and durable blade unit for rotary brush cutters, and one which will be exceedingly effective for the purpose for which it is designed.

These objects are accomplished by means of such structure and relative arrangement of parts as will fully appear by a perusal of the following specifications and claims.

In the drawings:

Fig. 1 is a side elevation of a rotary cutter for a brush cutter, equipped with a pair of my improved blade units.

Fig. 2 is a top plan view of a blade unit, detached.

Fig. 3 is an outer end view of the same.

Fig. 4 is a side elevation of a vertical blade, detached, and provided with a modified cutting edge contour.

Referring now more particularly to the drawings, and to the characters of reference marked thereon, the rotary cutter comprises a vertical drive shaft 1 on the lower end of which a diametral plate 2 is secured; this plate providing the mounting means for the blade units 3 now to be described.

There are two of these units, extending radially of the shaft in opposite directions, and since the units are duplicates of each other, a description of one will suffice for both.

Each such unit comprises a transversely flat horizontally extending bar 4 which is bent lengthwise to form a relatively short inner end portion 5, a horizontal outer end portion 6 on a lower level, and a connecting portion 7 which slopes upwardly between the outer and inner portions.

The inner end portion 5 underlies the plate 2 radially out from the shaft and is provided with longitudinally spaced, relatively large and small holes 8 and 9, respectively, to register with similar holes (not shown) in plate 2.

A mounting bolt 10 projects through the plate 2, hole 8, and another plate 11 under bar portion 5. A shear bolt 12 also projects through plate 2, hole 9, and plate 11, as shown in Fig. 1.

The outer end portion 6 of the bar 4 forms the blade proper, and is sharpened along its leading edge 13 with a downward bevel 14. A vertical blade 15 of generally rectangular form, and preferably somewhat thinner than blade 6, intersects said blade 6 substantially midway of the length thereof, and projects substantially equal distances above and below said blade 6, as shown. The blade 15 is wider than blade 6, and is disposed with its trailing edge 16 flush with the trailing edge 17 of blade 6, while the leading edge 18 of blade 15 is disposed some distance ahead of leading edge 13 of blade 6. Said leading edge 18 is sharpened with a bevel facing radially inward, as at 19, and said edge may be straight, as shown in Fig. 3, or formed below the plane of blade 6 with a forwardly sloping curve, as shown at 20 in Fig. 4. The trailing edge of the blade 13 is formed at each end with a relatively large bevel cut 21. Also, said blade may be flat between its leading and trailing edges and disposed at right angles to the bar 4, or it may be curved concentric with the axis of rotation of the blade unit, as shown at 22.

The blade 15 is initially separate from the blade 6 and is formed with a cut or notch 23 the same size as said blade in cross section and open to the trailing edge of blade 15 so as to fit over said blade from its leading edge. When the blades are fitted to each other they are immovably and permanently secured together by suitable means which is preferably welding extending along the contacting surfaces of the blades, as shown at 24.

In operation, the cutter is disposed with the lower edges of the vertical blades 15 just clear of the ground G, as shown in Fig. 1, and is rotated at an average speed of 1700 r.p.m. With the construction and arrangement of the parts of the cutter, as above described, the blades 6 cut through and chop up all cuttings disposed in their path and lying at an angle to the ground, and the upward bevel of the sharpened edges 13 of said blades tends to throw the cut material upwardly and against the confining shroud S mounted above the cutter clear of the blades 6. This helps keep the material, as chopped, in a loose and non-packed condition, and makes it easier to then disc the chopped-up material into the ground.

As the horizontal blades are thus chopping up the upstanding or angled cuttings, the vertical blades 15 chop up the cuttings lying horizontally on or adjacent the ground. The blades 15, extending as they do both above and below the horizontal blades, give an improved shredding action on the cuttings and engage certain cuttings, which—due to the frequently piled-up or heaped disposition thereof—would otherwise escape uncut over the horizontal blades.

The bevel 19 of the sharpened edges 18 of the blades 15, facing inwardly as it does, tends to cause the chopped material to be thrown toward the center, where such material is in position to be again engaged and further chopped as the cutter rotates.

The forward slope 20 of the cutting edge of the vertical blade not only has a tendency to lift the cuttings with which it comes in contact, but provides for a long period of wear without loss of efficiency in the event that the lower portion of the blade penetrates the ground, as it is apt to do, and is thus subjected to the abrasive action of the dirt.

The curving of the blades 15 gives them a more effective clearing action than they would otherwise have, and this is enhanced by the beveled cut-back 21 of the trailing edges of said blades. The blades 6 and 15 being practically integral, due to the weld connection, there is nothing to interfere with the free movement of the chopped material therepast.

The bars 4 on which the blades 6 are supported, being a considerable distance above said blades where they are connected to the central drive shaft, clearance is provided for the passage of the cut material thereunder, and possible clogging and catching of any of such material between the various mounting nuts of the bolts 10 and 12 is avoided.

While this rotary cutter has been particularly designed to handle cuttings of various kinds lying on the ground, it will also be effective in cutting a swath through corn stalks, standing brush, and similar growths, which—after being cut and lying on the ground—may then be chopped up or shredded by a subsequent pass of the rotary cutter, if necessary.

The parts of the rotary cutter are of sufficiently heavy stock to withstand somewhat severe strains without harm. If, however, some unyieldable objects should be encountered by any blade as it rotates, the related shear bolt 12 will give, enabling the blade unit to swing back about bolt 9 without possibly bending the cutter or damaging the drive shaft and associated parts.

From the foregoing description it will be readily seen that there has been produced such a device as will substantially fulfill the objects of the invention, as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful, and upon which Letters Patent are desired:

1. A blade unit for a rotary brush cutter having a vertical drive shaft and a radial plate secured on the lower end of the shaft; said unit comprising a bar projecting radially out from the shaft and secured to the plate, the outer end portion of the bar being horizontal and sharpened along its leading edge to form a cutting blade, and a vertical blade intersecting and secured to said horizontal blade intermediate its ends and projecting both above and below the same substantially equal amounts and having its leading edge sharpened and continuous from end to end.

2. A blade unit for a rotary brush cutter having a vertical drive shaft and a radial plate secured on the lower end of the shaft; said unit comprising a bar projecting radially out from the shaft and secured to the plate, the outer end portion of the bar being horizontal and sharpened along its leading edge to form a cutting blade, and a vertical blade intersecting and secured to said horizontal blade intermediate its ends and projecting both above and below the same substantially equal amounts and having its leading edge sharpened and continuous from end to end; the leading edge of the vertical cutter being disposed ahead of the leading edge of the horizontal blade.

3. A blade unit, as in claim 2, in which said edge of the vertical blade below the horizontal blade slopes forwardly.

4. A blade unit, as in claim 2, in which said edge of the vertical blade is cut on a bevel facing radially inward relative to the axis of rotation of the cutter.

References Cited in the file of this patent

UNITED STATES PATENTS

| 578,250   | Holland-Letz    | Mar. 2, 1897  |
|-----------|-----------------|---------------|
| 2,627,156 | Carter          | Feb. 3, 1953  |
| 2,706,441 | Caldwell et al. | Apr. 19, 1955 |
| 2,728,182 | Fulton et al.   | Dec. 27, 1955 |
| 2,764,865 | Pollard         | Oct. 2, 1956  |
| 2,786,318 | Caldwell et al. | Mar. 26, 1957 |